Patented Nov. 9, 1943

2,333,914

UNITED STATES PATENT OFFICE 2,333,914

ISOCYANATE TREATMENT OF POLYAMIDES

Gerard J. Berchet, Wilmington, Del., assignor to E. I. du Pont de Nemours & Company, Wilmington, Del., a corporation of Delaware No Drawing. Application July 2, 1940, Serial No. 343,659

16 Claims. (Cl. 260—78)

This invention relates to polymeric materials and more particularly to improved compositions comprising synthetic linear polyamides.

The synthetic linear polyamides which are improved by the practice of this invention are of the type described in Patents 2,071,250, 2,071,253 and 2,130,948. By reason of their outstanding flexibility, toughness and abrasion resistance, and immunity to chemical attack by substances with which electrical insulation is apt to be contacted, these polymers are suitable for use as insulation for electrical conductors. However, with respect to durability at elevated temperatures and with respect to resistance toward moisture, both important properties of insulating materials, the unmodified synthetic polyamides present the possibility of still further improvement. Much electro-magnetic equipment, e. g., motors, operates at elevated temperatures, and the present trend is toward operation at still higher temperatures. The failure of electrical equipment is usually attributed to breakdown of the insulation as a result of long exposure to these temperatures. The usefulness of an electrical insulation is also impaired by absorption of moisture which adversely affects such properties as dielectric strength, power factor, and dielectric loss. Synthetic polyamides absorb appreciable amounts of water under humid conditions and in this respect are inferior to many insulating materials.

The unique properties of synthetic linear polyamides also adapt them in many respects to the fabrication of bristles. Synthetic polyamide bristles, however, have an undesirable tendency to undergo large variations in stiffness. This is due to plasticization by water which is absorbed reversably according to the moisture content of the surroundings. Polyamide tooth brush bristles, for example, which are acceptably stiff at the low relative humidities of winter tend to become softer at the high relative humidities of summer.

Durability, inherent stiffness, and small variation in stiffness with humidity are also desirable for X-ray, cinematic, and wrapping film which are other products for which the synthetic polyamides have been found to be valuable. The polymers have also been used in the form of yarn for the fabrication of hose and fabrics where, again, improved durability and stiffness are advantageous, for the resilience of a fabric depends to some extent upon the stiffness of its constituent fibers, and considerable durability is required to withstand sunlight and the high temperatures encountered in ironing and pressing operations.

Several methods have been proposed previously for improving the durability of synthetic linear polymers, but none of these methods insofar as I am aware have at the same time resulted in both a decrease in water absorption and an increase in stiffness.

This invention has as an object the preparation of new and useful compositions of matter from synthetic linear polyamides. A further object is a method for improving the durability, water resistance and stiffness concomitantly of polyamides. Further objects will appear hereinafter.

These objects are accomplished by treating a synthetic linear polyamide with a substance containing at least one group of the formula $-N=C=X$ wherein X is oxygen or sulfur.

The polyamides used in the practice of this invention are polymers containing a plurality of amide (including thioamide) groups as an integral part of the main chain of atoms in the polymer, i. e., they contain a plurality of groups of the structure

where X is oxygen or sulfur and R is hydrogen or a monovalent hydrocarbon radical. As disclosed in the patents referred to above, these polyamides are derived from bifunctional polyamide-forming reactants and on hydrolysis with hydrochloric acid they revert to bifunctional reactants. Thus, a polyamide derived from a diamine and a dibasic acid yields, on hydrolysis with hydrochloric acid, a diamine hydrochloride and a dibasic acid. A polyamide derived from a monoaminomonocarboxylic acid likewise yields an amino acid hydrochloride.

The invention is advantageously applied to polyamides which have already been formed into a useful shape, e. g., filaments, bristles, films or coatings. This means that the polyamide treated will in general have an intrinsic viscosity above 0.4, where intrinsic viscosity is defined as in Patent 2,130,948, because most polyamides do not have filament- or film-forming properties unless they have an intrinsic viscosity of at least 0.4.

The agents used to improve the polyamides are preferably the diisocyanates, although other compounds referred to hereinafter which contain the above mentioned $-N=C=X$ group may be used.

The treatment is preferably conducted in either of two ways. The first comprises the immersion of the synthetic polyamide in undiluted agent (i. e. essentially pure agent) at 140–180° C. The second involves immersion of the polyamide in a dilute solution of the agent, preferably at 80–110° C., followed by removal of the polyamide therefrom and baking the polyamide at 180–220° C. The temperature of treatment is limited in some instances by a tendency of the polyamide to dissolve in the agent. For example, at 200° C. hexamethylene diisocyanate is an active solvent for many polyamides. At very low temperatures the rate of reaction is impractically low.

The presence of water in the polyamide has a considerable effect in the present process. Polyamides which have been dried prior to treatment to remove the appreciable quantity of water absorbed from the atmosphere are, surprisingly, less responsive to the diisocyanate treatment with regard to improvement in durability at elevated temperatures than are polyamides which have not been dried prior to treatment. When, therefore, improvement in durability is the main object it is preferred to use polyamides which contain absorbed moisture. When improvement in stiffness and moisture absorption alone is desired, it is preferred to use anhydrous polyamides.

The diisocyanates, of which hexamethylene diisocyanate is typical, are especially valuable reagents in the practice of this invention since they confer heat stability and at the same time increase stiffness and lessen water absorption, whereas the monoisocyanates are particularly useful only with respect to improving stiffness and lessening water absorption. Lauryl and stearyl isocyanates are among the preferred monofunctional reagents.

The following examples are illustrative of the methods used in the practice of this invention:

Example I

Lengths of 22 B. & S. gauge round copper magnet wire insulated with a 2-mil coat of polyhexamethylene adipamide were immersed in hexamethylene diisocyanate at 100° C. for 5, 15, and 30 minute intervals, respectively. The coating contained, prior to treatment, an amount of moisture corresponding to that absorbed at 50% relative humidity and 25° C., that is, about 2.5% by weight. Other lengths of coated wire were immersed in hexamethylene diisocyanate at 145° C. for similar intervals of time, and still others at 195° C. for 1, 2, 5, and 15 minute intervals. The wires were washed with toluene after removal from the bath and were aged, along with untreated lengths of the original coated wire, in a circulating air oven at 150° C. Samples were removed from the oven periodically and tested for flexibility of the coating by winding the wire around a mandrel $\tfrac{1}{32}''$ in diameter. The results of the test are given in the following table:

| Temperature of treatment, °C. | Time of treatment, minutes | Time in hours before the coating became brittle |
|---|---|---|
| Untreated control | None | 48 to 72 |
| 100 | 5 | 72 to 96 |
| 100 | 15 | 72 to 96 |
| 100 | 30 | 72 |
| 145 | 5 | 120 |
| 145 | 15 | 144–168 |
| 145 | 30 | More than 168 |
| 195 | 1 | 168 |
| 195 | 2 | 168–192 |
| 195 | 5 | 168 |

When the above experiment is repeated but the coated wire is dried for several days in vacuum over phosphorus pentoxide before treatment with the diisocyanate, the brittleness of the coating is about the same as that of an untreated coating. As previously indicated, however, the treated coating absorbs less moisture.

Example II

Drawn and conditioned polyhexamethylene adipamide bristles, prepared as described in Patent 2,157,117, were dried by storage in vacuo over phosphorus pentoxide and were immersed in hexamethylene diisocyanate for 18 hours at 25° C. followed by one hour at 165–170° C. The moisture absorption and the stiffness (modulus of elasticity) of the treated bristles as compared to an untreated control follows:

| Sample tested | Relative humidity at test | Water absorption (percentage increase in weight) | Modulus of elasticity ($\times 10^{-6}$) |
|---|---|---|---|
| | Per cent | | |
| Treated bristle | 50 | 2.0 | 0.56 |
| Untreated bristle | 50 | 2.6 | 0.45 |
| Treated bristle | 100 | 6.0 | 0.20 |
| Untreated bristle | 100 | 7.6 | 0.17 |

It will be seen that the stiffness of the bristle has been increased and the water absorption decreased by the treatment.

The method of determining the modulus of elasticity consisted in measuring the deflection produced by a weight placed at the center of a bristle supported near its ends. The modulus was calculated from the formula:

$$E = 4/3 \frac{Pl^3}{\pi d^4 y}$$

where E=modulus, P=weight in pounds, $l$=distance between supports in inches, $d$=diameter of the bristle in inches, and $y$=deflection in inches.

Example III

This example will illustrate an alternate method of treatment involving impregnation and baking. Anhydrous polyhexamethylene adipamide bristles, drawn and conditioned, were immersed in hexamethylene diisocyanate at room temperature for 48 hours, and after removal from the bath and washing with toluene were heated in a nonoxidizing atmosphere (nitrogen) at 218° C. for one hour. Properties of the treated bristle as compared to the untreated control follow:

| Specimen | Relative humidity at test | Water absorption (percentage increase in weight) | Modulus of elasticity ($\times 10^{-6}$) |
|---|---|---|---|
| | Per cent | | |
| Treated | 50 | 1.9 | 0.47 |
| Control (untreated) | 50 | 2.6 | 0.45 |
| Treated | 100 | 5.5 | 0.19 |
| Control (untreated) | 100 | 7.6 | 0.17 |

Example IV

Equally good results are obtained with blends of polyamides with nonheat-hardening phenol-formaldehyde type resins. For example, 176 parts of o-cyclohexyl phenol, 52.5 parts of aqueous formaldehyde, and 4 parts of concentrated hydrochloric acid (all parts by weight) were heated for 8 hours at 120° C. and poured into water and washed free of acid. Fifteen parts of the resin thus produced were ground in a ball-mill with 85 parts of hexamethylene diammonium adipate and the mixture was subjected to the usual polymerization cycle of unmodified hexamethylene diammonium adipate described in Patent 2,130,948. The resultant blend of polymers was melt extruded into bristles which were cold drawn to 400% of their original length and conditioned by heating for one hour in boiling water. The drawn and conditioned bristles were divided into two parts, one being kept as a control. The second part was dried over a dessicant, allowed to stand in hexamethylene diisocyanate for 3 days, and finally heated therein for one hour at 145–150° C. Properties of the treated bristle as compared to the untreated control follow:

| Specimen | Relative humidity at test | Water absorption (percentage increase in weight) | Modulus of elasticity ($\times 10^{-6}$) |
|---|---|---|---|
| | Per cent | | |
| Treated | 50 | 1.3 | 0.68 |
| Control (untreated) | 50 | 1.9 | 0.65 |
| Treated | 100 | 4.2 | 0.31 |
| Control (untreated) | 100 | 4.9 | 0.29 |

*Example V*

Drawn and conditioned bristles of 6-aminocaproic acid polymer were immersed in hexamethylene diisothiocyanate for two days at ordinary temperatures. The bristles were then removed, rinsed with toluene, and heated in a nitrogen atmosphere at 218° C. for one hour. The water absorption of the treated bristles at 50% and 100% relative humidity was 1.9% and 5.9%, respectively, as compared with 2.4% and 11.0% for untreated controls.

*Example VI*

Undrawn anhydrous polyhexamethylene adipamide bristles were contacted with a 15% solution of hexamethylene diisocyanate in dry toluene for one day. The bristles were removed from the bath and heated for one hour at 218° C. in nitrogen. As a result of this treatment the wet stiffness increased from 0.06 to 0.10 ($\times 10^6$) and the dry stiffness from 0.17 to 0.21 ($\times 10^6$).

*Example VII*

Undrawn polyhexamethylene adipamide bristles were predried and heated for 3 hours in a refluxing solution of dry toluene containing 10% by weight of lauryl monoisocyanate. The bristles were removed from the bath and heated for one hour at 218° in an atmosphere of nitrogen. The wet stiffness of the treated bristles was $0.10 \times 10^6$ and their water absorption at 100% relative humidity was 6.4% as compared to control values of $0.06 \times 10^6$ and 7.6%, respectively.

*Example VIII*

A sample of undrawn polyhexamethylene adipamide yarn was heated in a 25% solution of decamethylene diisocyanate in toluene for 22 hours at 100° C. The yarn was then extracted three times with hot toluene for 5 minutes, washed with alcohol and dried at 100° C. for one hour. The yarn was next cold drawn. The recovery from stretch of this yarn was about 10% better than that of untreated cold drawn polyhexamethylene adipamide yarn.

*Example IX*

Transparent, undrawn polyhexamethylene adipamide film, containing absorbed moisture, was immersed for 20 minutes in hexamethylene diisocyanate at 170° C. The treated film was difficult to cold draw whereas the untreated control was readily drawn to several hundred per cent its original length. The superior durability of the treated film was demonstrated in the accelerated aging test at 150° C. The untreated control became amber colored and very brittle after 24 hours, and deep brown in color and so brittle that shattering occurred on the slightest bending after 48 hours. In contrast, the treated film had a light amber color at 72 hours and did not crack on sharp bending after 338 hours at 150° C.

The treated film had the additional advantage of absorbing less water than the untreated control. At 50% relative humidity the treated film absorbed 2.36% moisture as compared with 3.11% for the control.

*Example X*

Polyhexamethylene adipamide film, drawn 200% and dried by storage at 0% relative humidity, was soaked in hexamethylene diisocyanate at 170° C. for 10 minutes. Excess diisocyanate was recovered by washing with acetone. The stiffness (modulus of elasticity) at various humidities of the treated film and the untreated control follow:

| | Modulus $\times 10^{-6}$ | | |
|---|---|---|---|
| | Dry | 50% relative humidity | Water-wet |
| Treated film | 0.37 | 0.26 | 0.09 |
| Untreated control | 0.35 | 0.18 | 0.065 |

As further examples of synthetic polyamides which can be treated according to the present invention there may be mentioned polydecamethylene adipamide, polydecamethylene sebacamide, poly-m-phenylene sebacamide, 7-aminoheptanoic acid polymer, 12-aminostearic acid polymer, as well as other polyamides and interpolyamides of the types mentioned in Patents 2,071,253 and 2,130,948. The polyamides may be oriented, e. g., by cold drawing or rolling, prior to treatment and may be modified with other substances, e. g., plasticizers, dyes, pigments, antioxidants; viscosity stabilizers, cellulose derivatives, and resins.

Preferred agents for treating the polyamides include diisocyanates and diisothiocyanates as well as the compounds of mixed functions such as the isocyanate-isothiocyanates. Additional examples of the above classes are: Polymethylene diisocyanates and diisothiocyanates such as ethylene diisocyanate, trimethylene diisocyanate, tetramethylene diisocyanate, pentamethylene diisocyanate, etc.; the corresponding diisothiocyanates; alkylene diisocyanates and diisothiocyanates such as propylene-1,2-diisocyanate, butylene-1,2-diisocyanate, butylene-1,3-diisocyanate, butylene-2,3-diisocyanate, and butylene-1,3-diisothiocyanate; alkylidine diisocyanates and diisothiocyanates such as ethylene diisocyanate ($CH_3CH(NCO)_2$), butylidene diisocyanate

and heptylidene diisothiocyanate

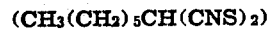

cycloalkylene diisocyanates and diisothiocyanates such as cyclopentylene-1,3-diisocyanate, cyclohexylene-1,2-diisocyanate, cyclohexylene-1,4-diisocyanate, and cyclohexylene-1,2-diisothiocyanate; aromatic diisocyanates and diisothiocyanates such as m-phenylene diisocyanate, p-phenylene diisocyanate, 1-methylphenylene-2,4-diisocyanate, naphthylene-1,4-diisocyanates, o,o'-tolane diisocyanate, diphenyl-4,4'-diisothiocyanate, m-phenylene diisothiocyanate, p-phenylene diisothiocyanate; aliphatic-aromatic diisocyanates or diisothiocyanates such as xylene-1,4-diisocyanate

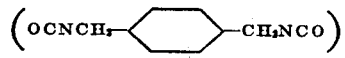

xylene-1,3-diisocyanate

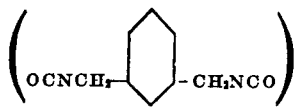

4,4'-diphenylene-methane diisocyanate

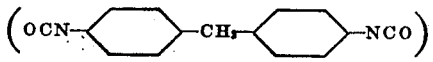

4,4'-diphenylenepropane diisocyanate

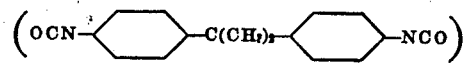

or xylylene-1,4-diisothiocyanate

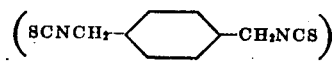

and diisocyanates and diisothiocyanates containing hetero-atoms such as SCNCH₂OCH₂NCS,

and

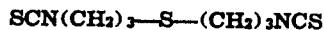

In fact any diisocyanate, diisothiocyanate, or mixed isocyanate-isothiocyanate of the general formula OCN—R—NCS in which R is a divalent organic radical will react with synthetic linear polyamides to give modified polymers according to the present invention. As examples of compounds containing more than two reactive groups of formula —N=C=X may be mentioned 1,2,4-benzene-triisothiocyanate and butane-1,2,2-triisocyanate.

Higher alkyl monoisocyanates, for example lauryl and stearyl isocyanates, give particularly favorable results when reacted with synthetic polyamides in the manner disclosed in this invention; however, any compound containing a group of the formula —N=C=X where X is S or O may be used in their stead. Additional examples of suitable monofunctional compounds include: Alkyl isocyanates and isothiocyanates, e. g., hexyl isocyanate and decamethylene isothiocyanate; alkenyl isocyanates and isothiocyanates, e. g., butenyl isocyanate and octadecen-9-yl-1 isothiocyanate; alkenyl isocyanates and isothiocyanates, e. g., butyn-2-yl-1 isothiocyanate and octadecyn-9-yl-1 isocyanate; cycloalkyl isocyanates and isothiocyanates, e. g., cyclohexyl isocyanate and cyclobutyl isothiocyanate; aryl isocyanates and isothiocyanates, e. g., salicyl isocyanate and naphthyl isothiocyanate; aralkyl isocyanates and isothiocyanates, e. g., benzyl isocyanate and styryl isothiocyanate; heterocyclic isocyanates and isothiocyanates, e. g., alpha-furfuryl isocyanate and thiazyl isothiocyanate; aliphatic isocyanates and isothiocyanates containing hetero atoms such as S, O, or N in the carbon chain, e. g., diethylamino-ethyl isocyanate, and alpha-(amylmercapto) butyl isothiocyanate, and acyl isothiocyanates such as stearoyl isocyanate.

Catalysts, e. g., metallic driers, may be used to accelerate the reaction although in general the reaction is sufficiently rapid to make the use of a catalyst unnecessary. The temperature and time of treatment and the choice of —N=C=X agent determine the extent to which the synthetic polyamides are modified. The more reactive diisocyanates, such as hexamethylene diisocyanate, bring about marked improvement in heat stability, stiffness, and water-proofness of the polymers within a relatively short time. Upon longer treatment the polymers become insoluble and no longer melt sharply, but rather soften at a higher temperature and may finally become infusible. It is obvious that the temperature and time of contact can be varied widely in effecting the objects described herein. In general, however, the time of treatment will vary from one minute to two hours, depending upon the temperature. As is apparent from Example I, the time of treatment can be reduced as the temperature is increased.

The treatment can be conducted either in the presence or absence of solvents or diluents, e. g., hydrocarbons, and at atmospheric, superatmospheric, or subatmospheric pressure. The reaction is preferably conducted in the absence of oxygen which may be accomplished either by operating in a partial vacuum or in the presence of an inert gas such as nitrogen. In some cases the reaction proceeds at ordinary temperatures, but in most cases it is desirable to operate at temperatures above 100° C. and below 300° C., preferably below 250° C. Modifying agents such as plasticizers or delusterants may be incorporated with the reaction mixture.

The quantity of —N=C=X compound consumed in the reaction is small, generally only a few percent based on the weight of the polyamide treated. Although quantities of 1 to 10% and even lower are sufficient to obtain an improvement in the polyamide, it is generally more advantageous to employ an excess of the —N=C=X compound and then remove the excess. If the compound used contains more than one —N=C=X group and it is desired that the polyamide shall remain soluble, the reaction must not be permitted to go to completion.

The polymer may be freed of excess agent by washing with an inert liquid, e. g., toluene, or with a liquid capable of decomposing unreacted agent, e. g., water. When the treatment has been carried out in solution, the polymer may be precipitated by the addition of a liquid in which it is insoluble such as an alcohol, acetone, or ethyl acetate.

The examples have shown the modification of synthetic polyamides which already have been fabricated into useful physical forms. The process is not limited thereto, however; good results may be obtained by modifying the polymers prior to fabrication. One method of accomplishing this comprises mixing or impregnating the polymer with the reagent at room temperature prior to conversion into useful physical form, for example, prior to passage through melting and pumping equipment for the extrusion of filaments, bristles, or films, or coatings on filamentary objects such as copper wire. In this case the reaction takes place while the polymer is being melted for extrusion and care must be exercised as to the quantity of the reagent employed, particularly if a diisocyanate, for infusible products can be obtained with an excess of a bifunctional reagent.

Continuous objects such as bristles, yarns, fabrics, films, and coated metallic conductors can be treated continuously by passage through a bath of the —N=C=X agent and then through a solvent bath to recover excess agent. The latter bath may be followed by a baking treatment at 100–250° C. to complete the reaction and to remove solvent, but this is usually unnecessary provided the initial reagent bath is maintained at a temperature of 100° or higher.

The process of the invention can also be applied to bulky masses of solid polyamide, e. g., molded articles. The treatment in this case, unless it is continued for a prolonged period, affects only the surface or outer portion of the polyamide. Nevertheless, such treatments are beneficial in improving the water resistance and heat stability of the products.

The modified synthetic polyamides obtained by the present processes are generally useful for the purposes mentioned in connection with the polyamides described in the previously mentioned patents. One important use is in the production of continuous filaments for use as bristles, threads, and in making fabrics. The polymers are also of value as films and as coatings for cloth, paper, leather, wire, etc. As already indicated the polyamides are advantageously treated by the processes herein described after fabrication into useful physical form. This is particularly true of insulating coatings on magnet wire, film for X-ray, photographic, and cinematic uses, bristles for the fabrication of brushes of various kinds, woven fabric, and unsupported and fabric-baked film for use as artificial leather. Fabrics made from polyamide yarn are made less subject to deterioration by ironing due to the improved stability at high temperature imparted to the polyamides by the present process.

As many apparently widely different embodiments of this invention may be made without departing from the spirit and scope thereof, it is to be understood that I do not limit myself to the specific embodiments thereof except as defined in the appended claims.

I claim:

1. A composition of matter comprising the reaction product of a synthetic linear polyamide and a substance containing at least one group of the formula —N=C=X where X is an element of the class consisting of oxygen and sulfur, said group being the only reactive group in said substance, said polyamide being the reaction product of a polyamide-forming composition comprising substantially equimolecular amounts of diamine and dibasic carboxylic acid.

2. The composition set forth in claim 1 in which said polyamide has an intrinsic viscosity of at least 0.4.

3. The composition set forth in claim 1 in which said substance comprises a diisocyanate containing the two isocyanate groups as the only reactive groups.

4. The composition set forth in claim 1 in which said substance comprises a diisothiocyanate containing the two isothiocyanate groups as the only reactive groups.

5. A composition of matter comprising the reaction product of polyhexamethylene adipamide and a diisocyanate, the only reactive group in said diisocyanate being the two isocyanate groups.

6. A composition of matter comprising the reaction product of a synthetic linear polyamide having an intrinsic viscosity above 0.4 and hexamethylene diisocyanate, said polyamide being the reaction product of a polyamide-forming composition comprising substantially equimolecular amounts of diamine and dibasic carboxylic acid.

7. Electrical insulation comprising the composition set forth in claim 1.

8. A filament comprising the composition set forth in claim 1.

9. A film comprising the composition set forth in claim 1.

10. A process which comprises reacting with heat treatment a synthetic linear polyamide and a substance containing at least one group of the formula —N=C=X where X is an element of the class consisting of oxygen and sulfur, said group being the only reactive group in said substance, said polyamide being the reaction product of a polyamide-forming composition comprising substantially equimolecular amounts of diamine and dibasic carboxylic acid.

11. The process set forth in claim 10 in which said polyamide is in a form presenting a large surface area.

12. The process set forth in claim 10 in which said polyamide has an intrinsic viscosity of above 0.4 and in which said substance comprises a diisocyanate containing the two isocyanate groups as the only reactive group.

13. The process set forth in claim 10 in which said polyamide has an intrinsic viscosity of above 0.4 and in which said substance comprises a diisothiocyanate containing the two isothiocyanate groups as the only reactive group.

14. A process which comprises reacting with heat treatment polyhexamethylene adipamide and a diisocyanate, the only reactive group in said diisocyanate being the two isocyanate groups.

15. A process which comprises reacting with heat treatment a polyamide having an intrinsic viscosity above 0.4 and hexamethylene diisocyanate, said polyamide being the reaction product of a polyamide-forming composition comprising substantially equimolecular amounts of diamine and dibasic carboxylic acid.

16. A process which comprises immersing synthetic linear polyamide in the form of a shaped article presenting a large surface area in a bath comprising a substance containing at least one group of the formula —N=C=X where X is an element of the class consisting of oxygen and sulfur, said group being the only reactive group in said substance, removing the polyamide from the bath and heating it at 100° to 250° C., said polyamide being the reaction product of a polyamide-forming composition comprising substantially equimolecular amounts of diamine and dibasic carboxylic acid.

GERARD J. BERCHET.